US010606912B2

(12) United States Patent
Morisaki

(10) Patent No.: US 10,606,912 B2
(45) Date of Patent: Mar. 31, 2020

(54) INFORMATION PROCESSING SYSTEM, INFORMATION PROCESSING METHOD, AND INFORMATION PROCESSING PROGRAM

(71) Applicant: NEC Corporation, Tokyo (JP)

(72) Inventor: Mitsunori Morisaki, Tokyo (JP)

(73) Assignee: NEC Corporation, Tokyo (JP)

( * ) Notice: Subject to any disclaimer, the term of this patent is extended or adjusted under 35 U.S.C. 154(b) by 180 days.

(21) Appl. No.: 15/562,282

(22) PCT Filed: Mar. 10, 2016

(86) PCT No.: PCT/JP2016/057645
§ 371 (c)(1),
(2) Date: Sep. 27, 2017

(87) PCT Pub. No.: WO2016/158303
PCT Pub. Date: Oct. 6, 2016

(65) Prior Publication Data
US 2018/0349505 A1 Dec. 6, 2018

(30) Foreign Application Priority Data
Mar. 31, 2015 (JP) ................................ 2015-072175

(51) Int. Cl.
*G06F 16/955* (2019.01)
*G06F 16/21* (2019.01)
(Continued)

(52) U.S. Cl.
CPC ........ *G06F 16/955* (2019.01); *G06F 3/04817* (2013.01); *G06F 16/00* (2019.01);
(Continued)

(58) Field of Classification Search
CPC .. G06F 16/955; G06F 16/219; G06F 16/2282; G06F 16/288; G06F 16/00;
(Continued)

(56) References Cited

U.S. PATENT DOCUMENTS

2006/0044975 A1* 3/2006 Miyake ............ G11B 20/00746 369/53.2
2011/0246882 A1* 10/2011 Kollenkark ........... G06F 16/447 715/716
(Continued)

FOREIGN PATENT DOCUMENTS

JP 2004-118737 A 4/2004
JP 2004-199741 A 7/2004
(Continued)

OTHER PUBLICATIONS

International Search Report corresponding to PCT/JP2016/057645, dated Jun. 7, 2016 (5 total pages).

*Primary Examiner* — Dung K Chau
(74) *Attorney, Agent, or Firm* — Wilmer Cutler Pickering Hale and Dorr LLP

(57) ABSTRACT

An information processing system that easily grasps the relationship between contents shared by communication includes a database that saves, in association with each other, a content identifier that identifies content data and a communication identifier that identifies communication performed in relation to the content data, and an associator that associates the first content identifier that identifies the first content data and the second content identifier that identifies the second content data by using a communication identifier that identifies communication performed between the first user and the second user when the first content data and the second content data are shared in relation to the communication.

9 Claims, 18 Drawing Sheets

(51) Int. Cl.

| | |
|---|---|
| ***G06F 16/28*** | (2019.01) |
| ***G06F 16/22*** | (2019.01) |
| ***H04L 29/06*** | (2006.01) |
| ***G06Q 10/10*** | (2012.01) |
| ***H04L 12/58*** | (2006.01) |
| ***G06F 16/00*** | (2019.01) |
| ***G06F 3/0481*** | (2013.01) |

(52) U.S. Cl.

CPC ........ *G06F 16/219* (2019.01); *G06F 16/2282* (2019.01); *G06F 16/288* (2019.01); *G06Q 10/10* (2013.01); *H04L 51/16* (2013.01); *H04L 65/1089* (2013.01); *H04L 65/403* (2013.01); *H04L 51/08* (2013.01)

(58) Field of Classification Search

CPC . G06F 3/04817; G06Q 10/10; H04L 65/1089; H04L 65/403

USPC ......... 707/741; 709/203, 219, 225; 715/716, 715/780

See application file for complete search history.

(56) References Cited

U.S. PATENT DOCUMENTS

| | | | | |
|---|---|---|---|---|
| 2012/0226390 | A1* | 9/2012 | Adams | G07C 5/008 701/1 |
| 2012/0260209 | A1* | 10/2012 | Stibel | G06Q 40/02 715/780 |
| 2012/0317239 | A1* | 12/2012 | Mulder | G06Q 10/101 709/219 |
| 2013/0031162 | A1* | 1/2013 | Willis | H04L 65/1069 709/203 |
| 2013/0113804 | A1* | 5/2013 | Ferman | G06T 11/206 345/440 |
| 2013/0173799 | A1* | 7/2013 | Lamotte | H04L 65/1069 709/225 |
| 2015/0040033 | A1* | 2/2015 | Kurtz | G06Q 10/107 715/752 |

FOREIGN PATENT DOCUMENTS

| | | | |
|---|---|---|---|
| JP | 2004-326227 | A | 11/2004 |
| JP | 2008-243079 | A | 10/2008 |
| JP | 2010-079674 | A | 4/2010 |
| JP | 2011-238201 | A | 11/2011 |
| JP | 2013-097808 | A | 5/2013 |
| JP | 2015-026178 | A | 2/2015 |

* cited by examiner

211

701

| CONTENT ID : AAA | | | | |
|---|---|---|---|---|
| USER ID | OPERATION | COMMUNICATION ID | PATH | DATE AND TIME |
| X | GENERATE/EDIT | C001 | C:¥userX¥aaa.doc | 2015.3.30.08.30 |
| Y | EDIT/SAVE WITH DIFFERENT NAMES | D002 | C:¥userY¥bbb.doc | 2015.3.31.15.30 |
| X | TRANSMIT MAIL | M003 | C:¥userX¥aaa.doc | 2015.3.31.18.30 |
| ⋮ | ⋮ | ⋮ | ⋮ | ⋮ |

702

| CONTENT ID : BBB | | | | |
|---|---|---|---|---|
| USER ID | OPERATION | COMMUNICATION ID | PATH | DATE AND TIME |
| Y | GENERATE/EDIT | D002 | C:¥userY¥bbb.doc | 2015.3.31.15.30 |
| Y, Z | SHARE MATERIAL DURING SPEECH COMMUNICATION | PH002 | C:¥userY¥bbb.doc | 2015.4.1.9.30 |
| X,Y,Z | SHARE CONFERENCE MATERIAL | ME003 | C:¥userY¥bbb.doc | 2015.4.1.13.30 |
| ⋮ | ⋮ | ⋮ | ⋮ | ⋮ |

703

| CONTENT ID : CCC | | | | |
|---|---|---|---|---|
| USER ID | OPERATION | COMMUNICATION ID | PATH | DATE AND TIME |
| Z | RECEIVE MAIL | M003 | C:¥userZ¥ccc.doc | 2015.4.1.8.30 |
| Y | EDIT/SAVE WITH DIFFERENT NAMES | D003 | C:¥userX¥bbb.doc | 2015.3.31.15.30 |
| ⋮ | ⋮ | ⋮ | ⋮ | ⋮ |

704

| CONTENT ID : DDD | | | | |
|---|---|---|---|---|
| USER ID | OPERATION | COMMUNI-CATION ID | PATH | DATE AND TIME |
| Z | SHARE MATERIAL DURING SPEECH COMMUNICATION | PH002 | C:¥userZ¥ddd.doc | 2015.4.1.9.30 |
| Z | TRANSMIT MAIL | M005 | | 2015.4.1.12.30 |
| ⋮ | ⋮ | ⋮ | ⋮ | ⋮ |

FIG. 7

| | CONTENT A HELD BY USER X | CONTENT B HELD BY USER Y | CONTENT C HELD BY USER Y | CONTENT D HELD BY USER Y | CONTENT E HELD BY USER X | CONTENT F HELD BY USER X | ... |
|---|---|---|---|---|---|---|---|
| CONTENT A | | B=A<br>ATTACHED TO MAIL RECEIVED FROM X<br>2015/3/30.15:30<br>COMMUNICATION ID : M003 | C≠A<br>SHARED AT TV CONFERENCE WITH X<br>2015/3/30.17:30<br>COMMUNICATION ID : ME003 | D≠A<br>ATTACHED TO RETURN MAIL FOR A RECEIVED FROM X<br>2015/3/30.15:50<br>COMMUNICATION ID : R003 | A≠E<br>ATTACHED TO RECEIVED MAIL<br>2015/3/31.15:50<br>COMMUNICATION ID : R004 | F>A<br>EDITED BY Z TO GENERATE A<br>2015/3/28.18:30<br>COMMUNICATION ID : D003 | |
| CONTENT B | A=B<br>ATTACHED TO MAIL TRANSMITTED TO Y<br>2015/3/30.15:30<br>COMMUNICATION ID : M003 | | C>B<br>Z EDITS AND SAVES B<br>2015/3/28.12:30<br>COMMUNICATION ID : D002 | D≠B | E≠B | F>B<br>EDITED BY X TO GENERATE B<br>2015/3/28.18:30<br>COMMUNICATION ID : D004 | |
| CONTENT C | A≠C<br>SHARED AT TV CONFERENCE WITH Y<br>2015/3/30.17:30<br>COMMUNICATION ID : ME003 | B<C<br>EDITED BY Z TO GENERATE C<br>2015/3/28.12:30<br>COMMUNICATION ID : D002 | | D≠C | E≠C | F>>C<br>EDITED BY X AND Z TO GENERATE C<br>2015/3/28.18:30<br>COMMUNICATION ID : D005 | |
| CONTENT D | A≠D<br>TRANSMITTED MAIL RETURNED FROM Y ATTACHED TO ORIGINAL MAIL OF ATTACHMENT D<br>2015/3/30.15:50<br>COMMUNICATION ID : R003 | B≠D | C≠D | | E=D<br>ATTACHED TO MAIL RECEIVED FROM Y<br>2015/3/30.15:50<br>COMMUNICATION ID : M005 | F≠D | |
| CONTENT E | A≠E<br>RECEIVED MAIL RETURNED FROM Y ATTACHED TO ORIGINAL MAIL OF ATTACHMENT E<br>2015/3/31.15:50<br>COMMUNICATION ID : R004 | B≠E | C≠E | D=E<br>ATTACHED TO MAIL TRANSMITTED TO X<br>2015/3/30.15:50<br>COMMUNICATION ID : M005 | | F≠E | |
| CONTENT F | A>F<br>EDITED FROM F AND SAVED BY Z<br>2015/3/28.18:30<br>COMMUNICATION ID : D003 | B<F<br>X EDITS AND SAVES F<br>2015/3/28.12:30<br>COMMUNICATION ID : D004 | C<<F<br>EDITED BY X AND Z TO GENERATE F<br>2015/3/28.18:30<br>COMMUNICATION ID : D005 | D≠F | E≠F | | |
| ⋮ | | | | | | | |

INFORMATION PROCESSING SYSTEM, INFORMATION PROCESSING METHOD, AND INFORMATION PROCESSING PROGRAM

CROSS REFERENCE TO RELATED APPLICATIONS

This application is a national stage application of International Application No. PCT/JP2016/057645 entitled "INFORMATION PROCESSING SYSTEM, INFORMATION PROCESSING METHOD, AND INFORMATION PROCESSING PROGRAM", filed on Mar. 10, 2016, which claims the benefit of priority from Japanese patent application No. 2015-072175, filed on Mar. 31, 2015, the disclosures of each of which are hereby incorporated by reference in their entirety.

TECHNICAL FIELD

The present invention relates to an information processing system, an information processing method, and an information processing program.

BACKGROUND ART

In the above technical field, patent literature 1 discloses a system that performs document retrieval by using information according to a location or time of document information display.

CITATION LIST

Patent Literature

Patent literature 1: Japanese Patent Laid-Open No. 2015-26178

SUMMARY OF THE INVENTION

Technical Problem

In the technique described in the above literature, however, it is impossible to grasp the relationship between contents.

The present invention enables to provide a technique of solving the above-described problem.

Solution To Problem

One aspect of the present invention provides an information processing system comprising:

a database that saves, in association with each other, a content identifier that identifies content data and a communication identifier that identifies communication performed in relation to the content data; and an associator that associates a first content identifier that identifies first content data and a second content identifier that identifies second content data by using a communication identifier that identifies communication performed between a first user and a second user when the first content data and the second content data are shared in relation to the communication.

Another aspect of the present invention provides an information processing method comprising:

saving, in association with each other, a content identifier that identifies content data and a communication identifier that identifies communication performed in relation to the content data; and associating a first content identifier that identifies first content data and a second content identifier that identifies second content data by using a communication identifier that identifies communication performed between a first user and a second user when the first content data and the second content data are shared in relation to the communication.

Still other aspect of the present invention provides an information processing program for causing a computer to execute a method, comprising:

saving, in association with each other, a content identifier that identifies content data and a communication identifier that identifies communication performed in relation to the content data; and associating a first content identifier that identifies first content data and a second content identifier that identifies second content data by using a communication identifier that identifies communication performed between a first user and a second user when the first content data and the second content data are shared in relation to the communication.

Advantageous Effects of Invention

According to the present invention, it is possible to easily grasp the relationship between contents shared in relation to communication.

BRIEF DESCRIPTION OF DRAWINGS

FIG. 7 is a view showing a content communication related database in the information processing system according to the second example embodiment of the present invention;

FIG. 9 is a content relation table in the information processing system according to the second example embodiment of the present invention;

DESCRIPTION OF EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

[First Example Embodiment]

Figure 1:
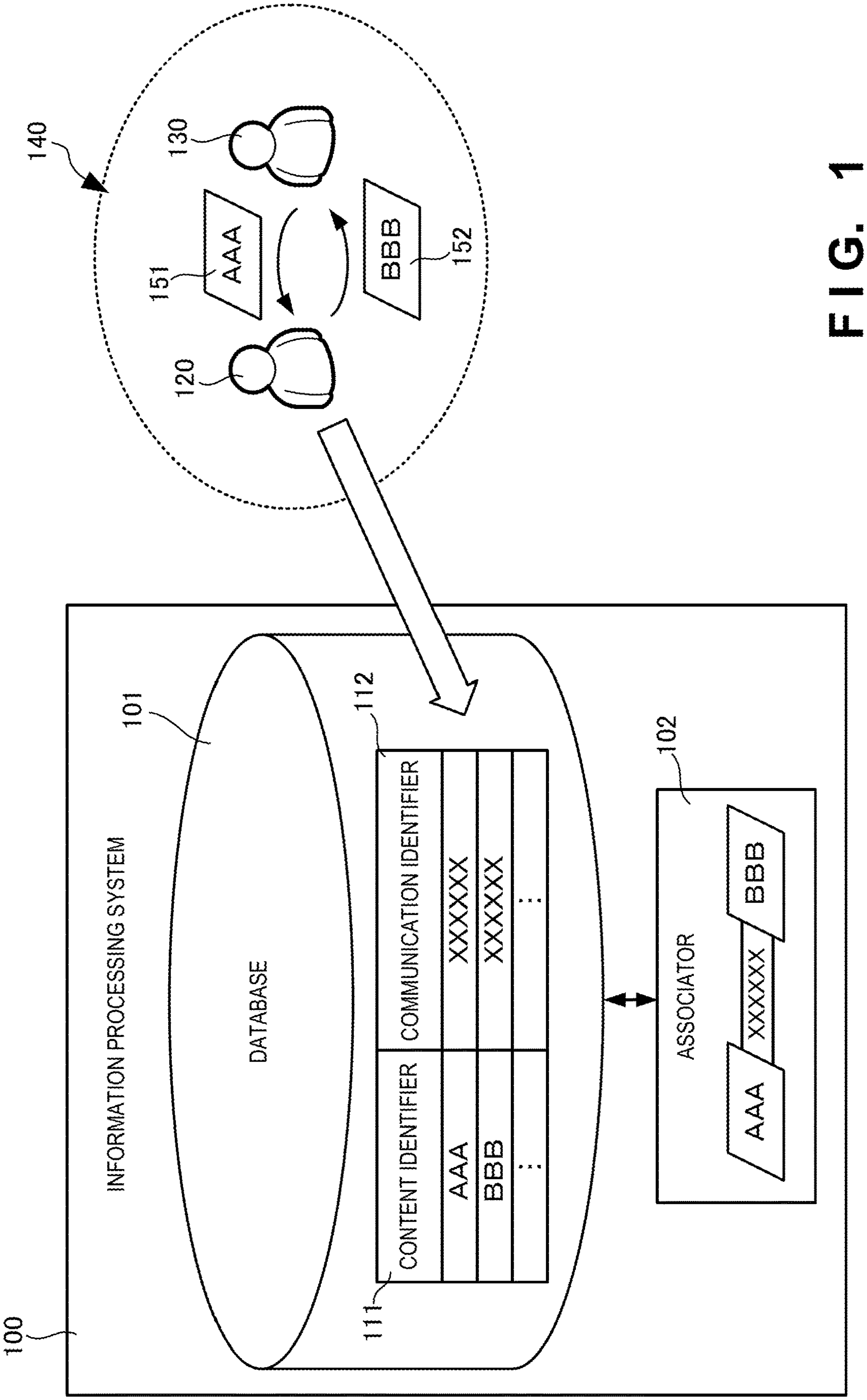
FIG. 1 is a block diagram showing the arrangement of an information processing apparatus according to the first example embodiment of the present invention.

An information processing apparatus 100 according to the first example embodiment of the present invention will be described with reference to FIG. 1. As shown in FIG. 1, the information processing apparatus 100 includes a database 101 and an associator 102.

The database 101 saves, in association with each other, a content identifier 111 that identifies content data 151 and 152, and a communication identifier 112 that identifies communication 140 between users 120 and 130 related to the content data 151 and 152.

When the content data 151 and the content data 152 are shared by performing the communication 140 between the user 120 and the user 130, the associator 102 associates the content data 151 and the content data 152 with each other. At this time, the associator 102 associates them with each other by using the communication identifier 112 that identifies the communication 140 between the user 120 and the user 130.

It is possible to easily grasp various relationships among contents shared in relation to communication.

[Second Example Embodiment]

Figure 2:
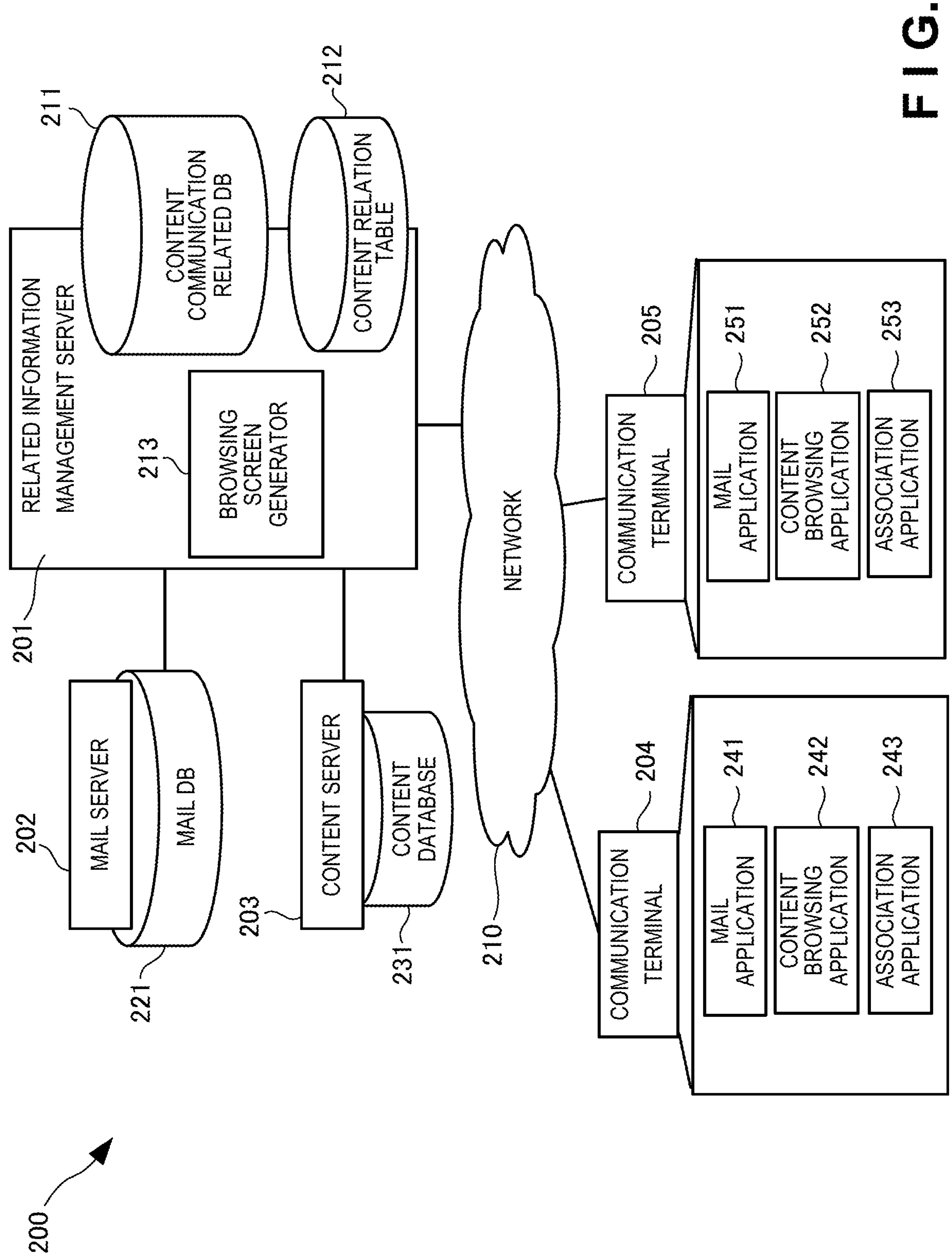
FIG. 2 is a block diagram showing the arrangement of an information processing system according to the second example embodiment of the present invention.

An information processing system 200 according to the second example embodiment of the present invention will be described with reference to FIG. 2. FIG. 2 is a block diagram for explaining the functional arrangement of the information processing system 200 according to this example embodiment.

The information processing system 200 includes a related information management server 201, a mail server 202, and a content server 203 and is connected to, via a network 210, at least two communication terminals 204 and 205 (such as a PC (Personal Computer), a smartphone, or a tablet). Although not shown here, the information processing system 200 may include, as a communication server of the mail server 202, a material sharing server, a scheduler server, a Web conference server, a speech control server, or the like.

The related information management server 201 includes a content communication related database 211, a content relation table 212, and a browsing screen generator 213.

The content communication related database 211 saves, in association with each other, a content identifier that identifies content data and a communication identifier that identifies communication performed in relation to the content data.

When at least two content data related to each other are generated by performing communication, the content relation table 212 registers the relation between at least two content data by using the communication identifier.

The browsing screen generator 213 displays icons representing at least two content data and further generates, between those icons, a screen that displays a link indicating the relation between the content data. As the link indicating the relation between the content data, in particular, a link corresponding to the type of communication that connects those content data to each other is displayed.

The mail server 202 includes a mail database 221 and manages a mail exchange between the terminals via the network 210.

The content server 203 includes a content database 231, and controls readout and storage of a content.

The communication terminals 204 and 205, respectively, include mail applications 241 and 251, content browsing applications 242 and 252, and association applications 243 and 253. The mail applications 241 and 251 exchange, via the mail server 202, mails with another PC, a smart device, a tablet, and the like. At this time, a mail attached with a content is exchanged in accordance with a user instruction. Each of the communication terminals 204 and 205 may additionally include a schedule application, a speech communication application, a material sharing application, a Web conference application, and the like. In this case, each application can perform, by utilizing a corresponding one of communication servers, exchange, sharing, and the like of contents with the other communication terminal.

Figure 3:
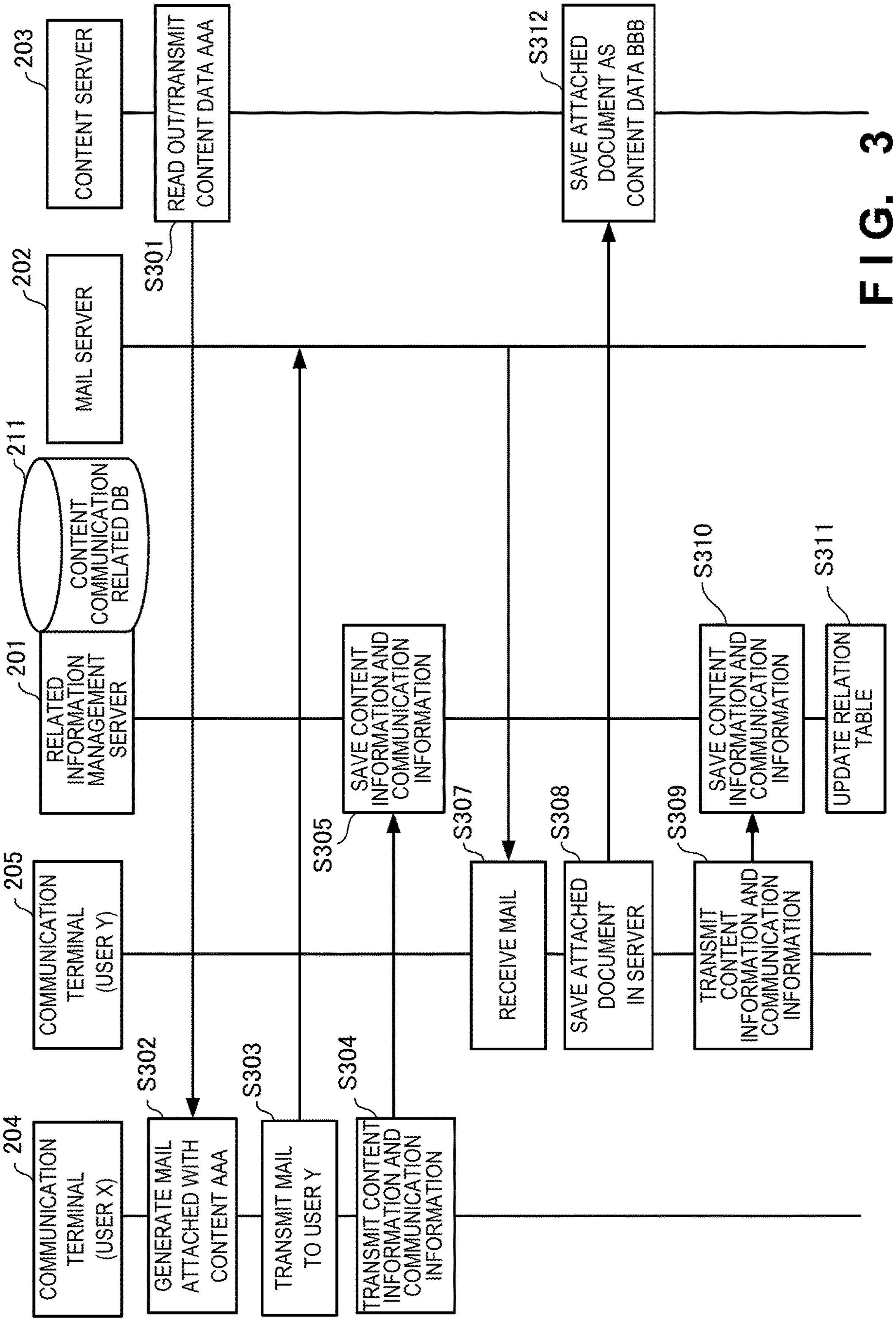
FIG. 3 is a sequence chart showing the operation of the information processing system according to the second example embodiment of the present invention.

FIG. 3 is a sequence chart for explaining an association operation when the mail attached with the content is transmitted from the communication terminal 204 to the communication terminal 205. As an example, a case will be described here in which user X uses the communication terminal 204 to transmit, to user Y, content AAA saved in the content server 203.

First, in step S301, in accordance with an instruction from the communication terminal 204, content data AAA is read out from the content server 203 and transmitted to the communication terminal 204.

Then, in step S302, the communication terminal 204 generates a mail attached with content data AAA. Further, in step S303, the communication terminal 204 transmits the mail to user Y. In step S304, the communication terminal 204 sends, to the related information management server 201, content information (information indicating the specific location of content data AAA in the content server 203) and communication information (information indicating who, when, and how content AAA is shared with). In step S305, the related information management server 201 saves the content information and the communication information. At this time, the related information management server 201 saves the content information (for example, the path of content data AAA) by giving it a unique communication ID (for example, XXX) that identifies the mail.

On the other hand, in step S307, the communication terminal 205 receives, from the mail server 202, a mail from user X attached with content data AAA when user Y performs a mail receiving operation for the communication terminal 205. Then, in step S308, when the communication terminal 205 performs a process of saving an attached content in a server, in step S312 it is saved in the content server 203 as content data BBB. Content data AAA and content data BBB are saved in the content server 203 as different files, although they are the same in contents.

In step S309, the communication terminal 205 sends, to the related information management server 201, content information (information indicating where content data BBB is in the content server 203) and communication information (information indicating who, when, and how content data BBB is shared with). In step S310, the related information management server 201 saves the content information and the communication information. At this time, the related information management server 201 saves the content information (for example, the path of content data BBB) by giving it a unique communication ID (for example, XXX) that identifies the mail.

In step S311, a relation table is updated by using content communication relation information saved in steps S305 and S310. That is, the relation between the pieces of content information is registered in the content relation table 212 by using the communication ID.

Figure 4:
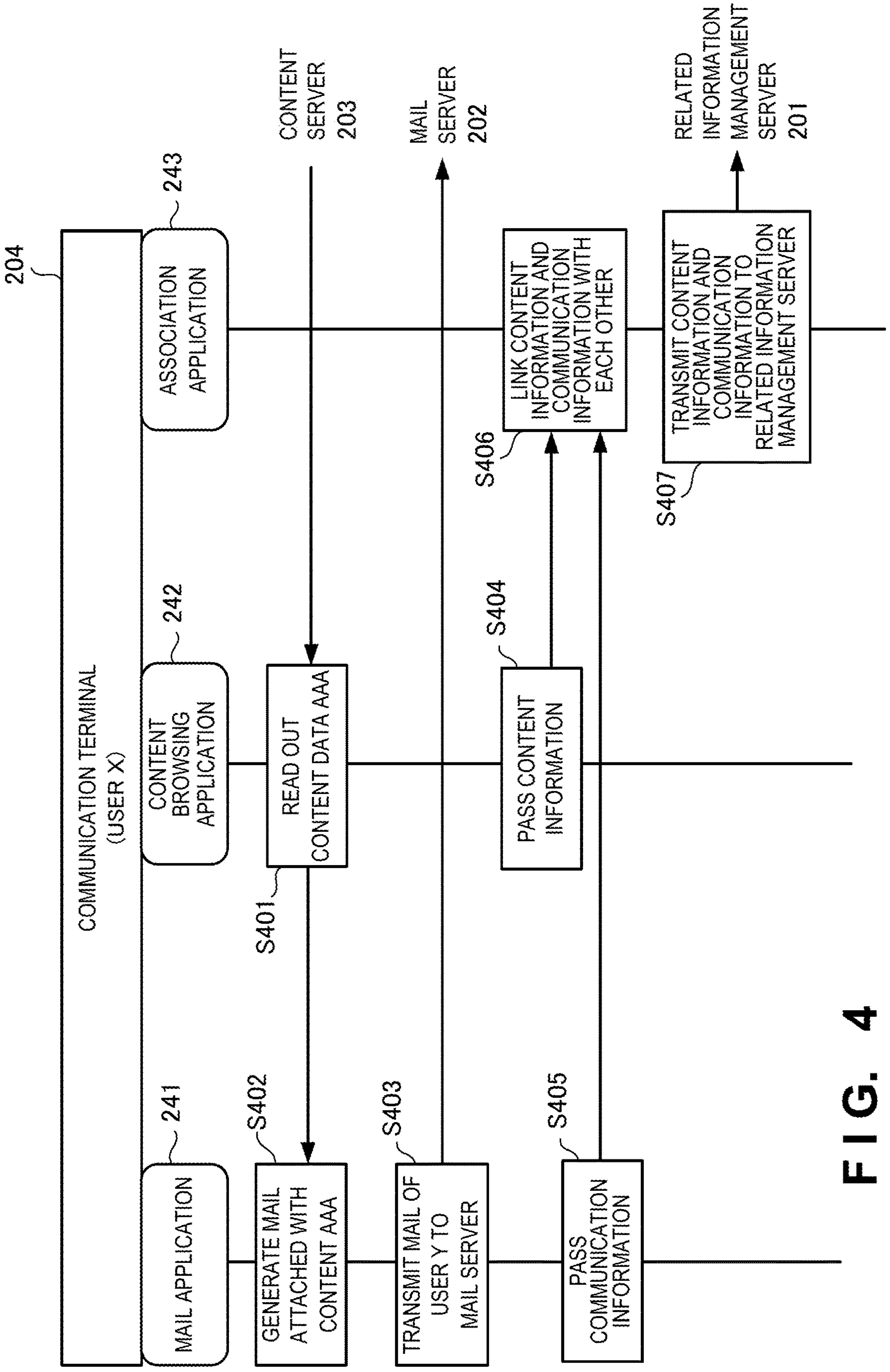
FIG. 4 is a sequence chart showing the operation of a communication terminal included in the information processing system according to the second example embodiment of the present invention.

The sequence of mail transmission processing performed in the communication terminal 204 will now be described with reference to FIG. 4. First, in step S401, the content browsing application 242 reads out content data from the content server 203 and displays the readout data. Then, in step S402, the mail application 241 generates a mail attached with content data AAA being browsed by the content browsing application 242.

Subsequently, in step S403, the mail application 241 transmits, to the mail server 202, a mail obtained by attaching content data AAA to a mail transmitted to user Y.

After the completion of the mail transmission, in steps S404 and S405, the content browsing application 242 and the mail application 241, respectively, pass content information and communication information to the association application 243. The content information here is identification information of content data and basically indicates a path. That is, it indicates an address and file name saved in the content server 203. On the other hand, the communication information is identification information of the mail transmission as communication, and may include the transmission source, destination, transmission date and time, Subject, Message-Id, and the like of a mail.

The association application 243 links the content information and the communication information with each other in step S406, and further transmits a set thereof to the related information management server 201 in step S407.

Note that a case has been described in which the content data read out from the content server 203 is attached to the mail in this series of sequences. However, the present invention is not limited to this. The content data stored in a storage (not shown) in the communication terminal 204 may be attached.

Figure 5:
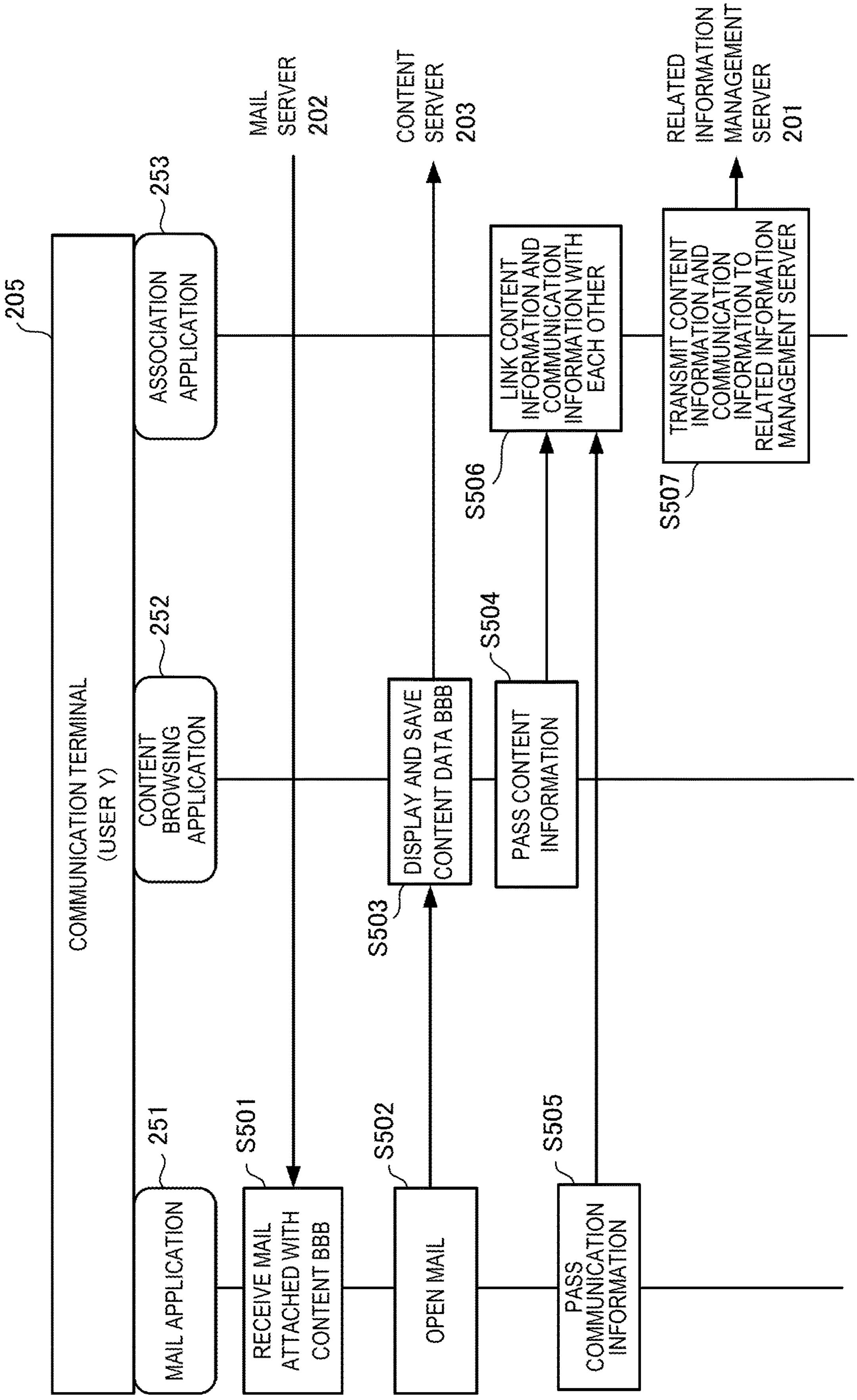
FIG. 5 is a sequence chart showing the operation of the communication terminal included in the information processing system according to the second example embodiment of the present invention.

The sequence of mail reception processing performed in the communication terminal 205 will now be described with reference to FIG. 5. First, in steps S501 and S502, the mail application 251 accesses the mail server 202 to receive and open a mail attached with content data BBB. This content data BBB is a copy of content data AAA transmitted from the communication terminal 204. Although the same in contents, content data BBB is different from content data AAA at a point in time when being attached to the communication terminal 204.

Subsequently, in step S503, the content browsing application 252 displays content data AAA and saves, content data BBB being browsed by the content browsing application 252 in the content server 203.

After the completion of saving the content data, in steps S504 and S505, the content browsing application 252 and the mail application 251, respectively, pass content information and communication information to the association application 253. The content information here is identification information of content data and basically indicates a path. That is, it indicates an address and file name saved in the content server 203. On the other hand, the communication information is identification information of the mail reception as communication, and may include the transmission source, destination, transmission date and time, Subject, Message-Id, and the like of a mail.

The association application 253 links the content information and the communication information with each other in step S506, and further transmits a set thereof to the related information management server 201 in step S507.

Note that a case has been described in which the content data is saved in the content server 203 in this series of sequences. However, the present invention is not limited to this. The content data may be saved in a storage (not shown) in the communication terminal 205, and a path thereof may be transmitted to the related information management server 201.

Figure 6:
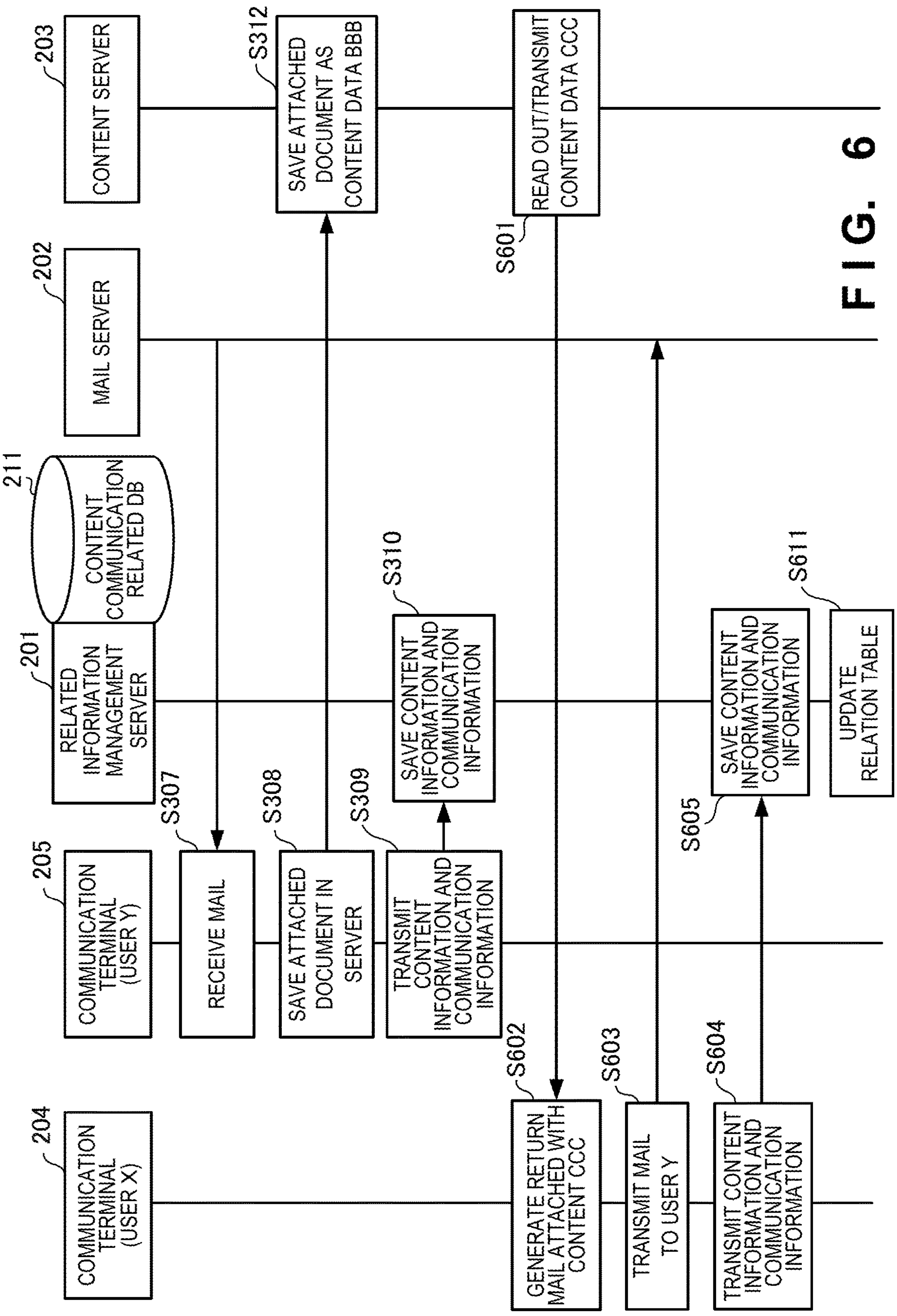
FIG. 6 is a sequence chart showing the operation of the information processing system according to the second example embodiment of the present invention.

An association operation when a mail attached with a content is returned from the communication terminal 205 to the communication terminal 204 will be described with reference to FIG. 6. As an example, case will be described here in which user X uses the communication terminal 204 to return, to user Y, content CCC saved in the content server 203. The same reference numerals denote the same processing as that shown in FIG. 3, and a description thereof will be omitted.

First, in step S601, in accordance with an instruction from the communication terminal 204, the content server 203 reads out content data CCC and transmits it to the communication terminal 204.

Then, in step S602, the communication terminal 204 generates a return mail attached with content data CCC. Further, in step S603, the communication terminal 204 transmits the return mail to user Y. In step S604, the communication terminal 204 sends, to the related information management server 201, content information (information indicating where content data CCC is in the content server 203) and communication information (information indicating who, when, and how content data CCC is shared with). In step S605, the related information management server 201 saves the content information and the communication information. At this time, the related information management server 201 saves the content information (for example, the path of content data CCC) by giving it a unique communication ID (for example, XXX) that identifies transmission/reception of the return mail.

In step S611, a relation table is updated by using content communication relation information saved in steps S310 and S605.

It is possible to update the content communication related database 211 and the content relation table 212 by performing the same processing when mail transfer is performed as well. More specifically, the related information management server 201 receives, from each communication terminal, content information (information regarding a content attached to a transferred mail that has been transmitted/received) and communication information (information that specifies a specific time, recipient, or the like of the transferred mail and a transfer source mail), and registers them.

The mail transmission/reception has been described above as an example of communication. It is also possible, however, to update the content communication related database 211 and the content relation table 212 in the same manner in another communication. For example, material sharing processing during speech communication or during a conference can be given as another example. In this case, this becomes, as communication information, information indicating the time, place, and persons in the speech communication or the conference, and the same communication ID is given to the same speech communication or the same conference. This makes it possible to link a plurality of content data shared by the same speech communication or the same conference. Note that the conference may be a Web conference or a face-to-face conference.

FIG. 7 is a view showing an example of the content communication related database 211. In this database 211, history tables 701 to 704 of communication and editing for respective contents are stored as an example.

Referring to the history table 701, it can be seen that content data AAA is generated by user X, and then saved with a different name by user Y. The history table 702 is generated regarding the content saved with the different name as new content data BBB. When user X mails content data AAA before being saved with the different name as an attached file, user Z serving as a destination thereof receives it, and the history table 703 for content data CCC is generated. Note that transmission and reception of the same mail are considered to be one operation, and the same communication ID is given. However, the present invention is not limited to this. It may be configured such that different communication IDs are given so as to clarify the relationship among those communication IDs.

Referring to the history table 702, it can be seen that content data BBB is a target of material sharing during the speech communication. If user Z saves content data BBB as new content data DDD at the end of this material sharing, the history table 704 is newly generated.

As described above, it becomes possible, by generating and updating the history table for each content data, to link a plurality of content data with each other via a communication ID. Note that if the communication ID is also shared by a mail server, a Web conference server, and the like each serving as a communication server, it is also possible to obtain more detailed information (a location, a purpose, and the like) of each communication with reference to a corresponding one of the communication servers. In the history table 702, in addition to an edit history and an attachment history, the histories of printing, display, a used location, partner, and the like may be shown on a time base.

As described above, the content communication related database 211 saves, in association with each other, a content identifier and a communication identifier that identifies an email attached with content data corresponding to the content identifier.

The content communication related database 211 saves, in association with each other, a content identifier and a communication identifier that identifies speech communication performed while sharing and browsing content data corresponding to the content identifier.

The content communication related database 211 saves, in association with each other, a content identifier and a communication identifier that identifies a conference taken place while sharing and browsing content data corresponding to the content identifier.

Figure 8:
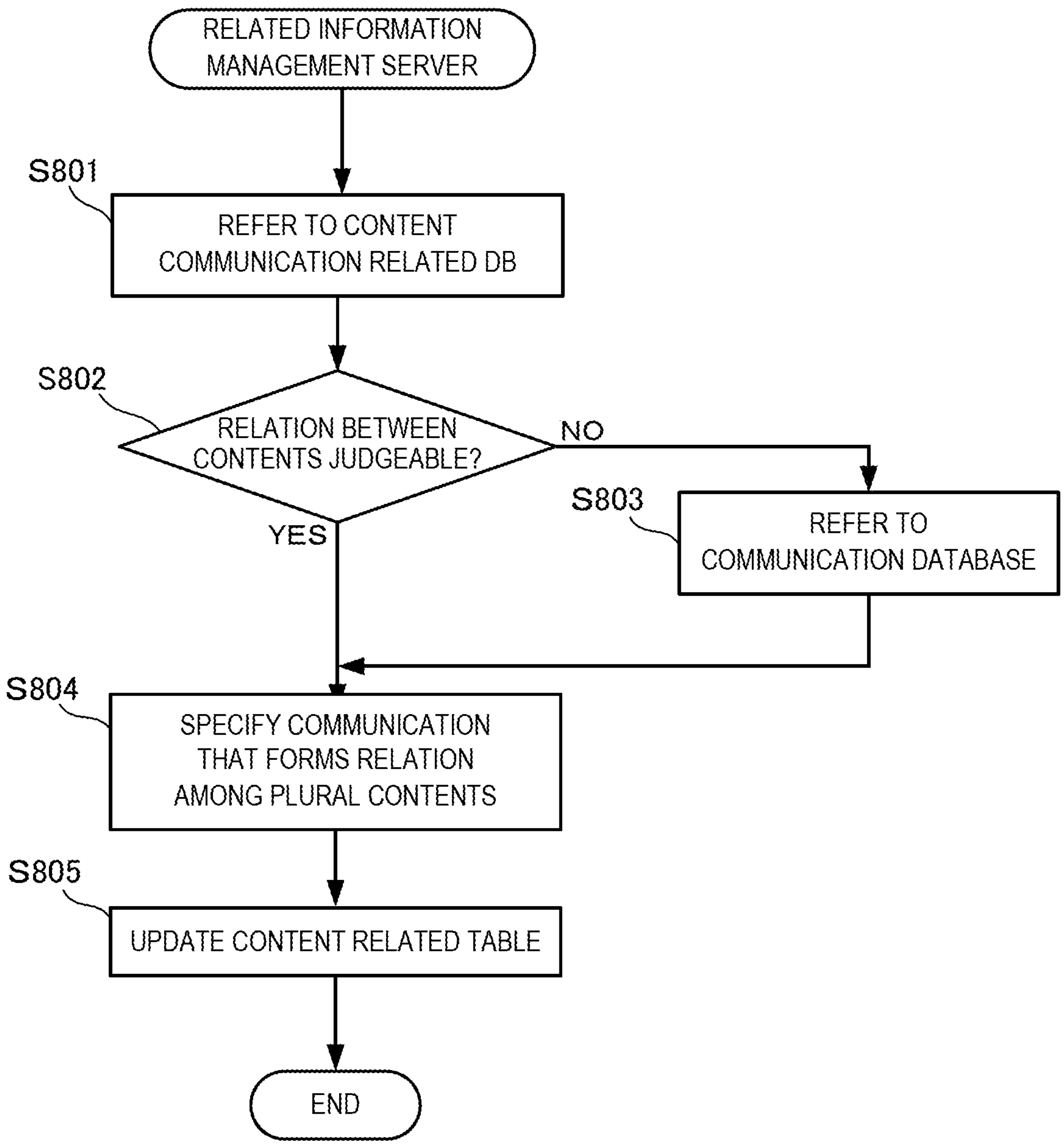
FIG. 8 is a flowchart showing the sequence of processing by a related information management server in the information processing system according to the second example embodiment of the present invention.

FIG. 8 is a flowchart showing the sequence of processing in which the related information management server 201 generates the content relation table 212 from the content communication related database 211. Referring to FIG. 8, in step S801, the related information management server 201 refers to the content communication related database 211 as shown in FIG. 7. Next, in step S802, the related information management server 201 judges whether the relation between contents can be judged. For example, if the content does not have a communication ID common to any other contents, the process advances to step S803 in which the related information management server 201 judges whether there is the relation with other contents with reference to a communication database (the mail database 221 in FIG. 2).

If the content with the relation is found, the process advances to step S804 in which the related information management server 201 specifies communication that forms the relation among a plurality of contents. Then, the process advances to step S805 in which the related information management server 201 updates the content relation table 212.

FIG. 9 is a table showing an example of the content relation table 212. As shown in FIG. 9, the content relation table 212 specifies contents related to each other among a plurality of contents and represents the relation by communication. Note that FIG. 9 merely shows an example of the content relation table 212, and the present invention is not limited to this.

There is a case in which the first content data held by the first user is transmitted to the second user by an email and is held by the second user as the second content data. In this case, the related information management server 201 associates the first content data and the second content data with each other by a communication identifier that identifies the email, as shown in FIG. 9. There is also a case in which both a terminal of the first user and a terminal of the second user share (browse) the first content data and the second content data while the first user and the second user perform speech communication. In this case, the related information management server 201 associates the first content data and the second content data by a communication identifier that identifies the speech communication. Further, there is a case in which the first content data and the second content data are browsed at a Web conference in which the first user and the second user participate. In this case, the related information management server 201 associates the first content data and the second content data with each other by a communication identifier that identifies the conference.

FIGS. 10 to 16 are views each showing an example of a screen generated in the browsing screen generator 213 when the relation among a plurality of contents is displayed.

While specifying a pair of related contents and displaying them with icons with reference to the content relation table 212, the browsing screen generator 213 displays, between those icons, a link representing communication or an operation that connects the pair of those contents.

Figure 10:
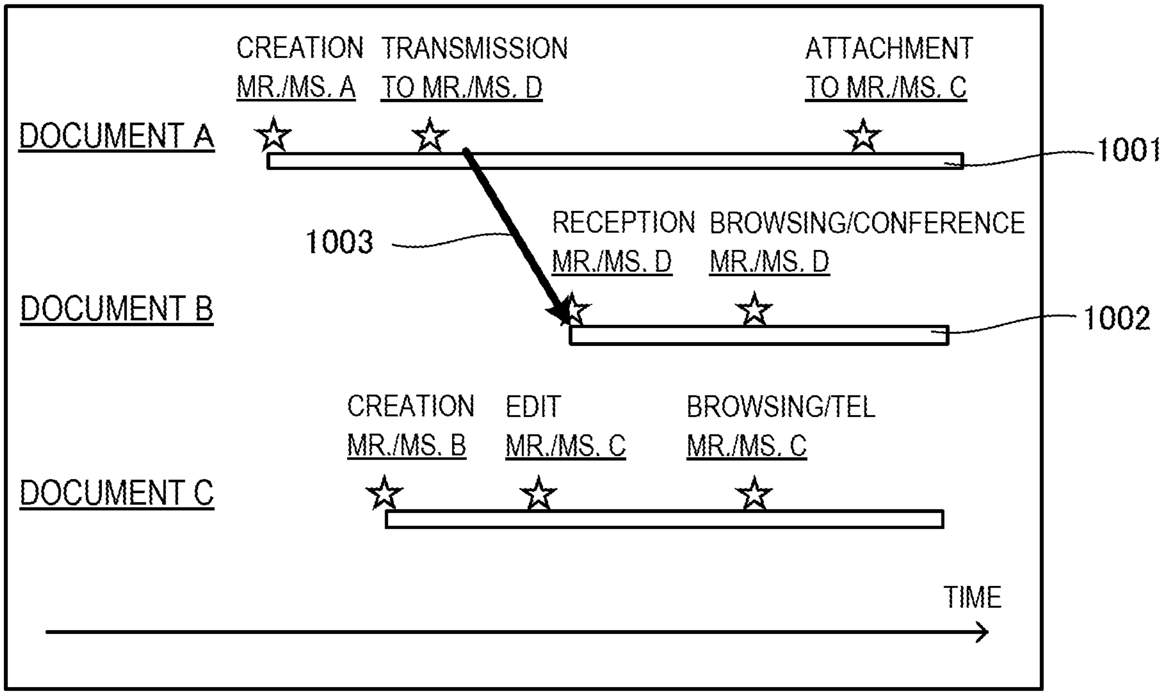
FIG. 10 is a view showing an example of a display image in the information processing system according to the second example embodiment of the present invention.

For example, in FIG. 10, the browsing screen generator 213 displays a timeline 1001 indicating the use history of document A serving as the first content data and a timeline 1002 indicating the use history of document B serving as the second content data. The browsing screen generator 213 further displays, between the timelines 1001 and 1002, a link 1003 corresponding to the timing and type of communication.

Figure 11:
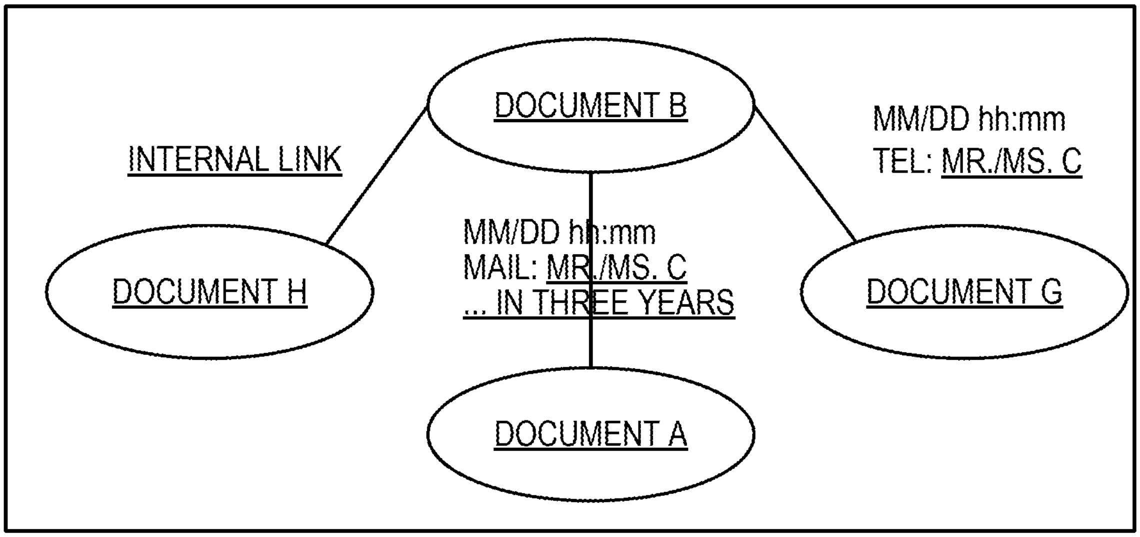
FIG. 11 is a view showing an example of a display image in the information processing system according to the second example embodiment of the present invention.

The browsing screen generator 213 may specify content data (here, document B) having the relations with the largest number of other content data and display a tree diagram having that document B at the center as in FIG. 11. In FIG. 11, in particular, the browsing screen generator 213 displays the editorial transition of each content data in the tree diagram, making it possible to have an extremely clear grasp on, for example, what kind of document is referred to by a specific person who edits and creates a document file.

Figure 12:
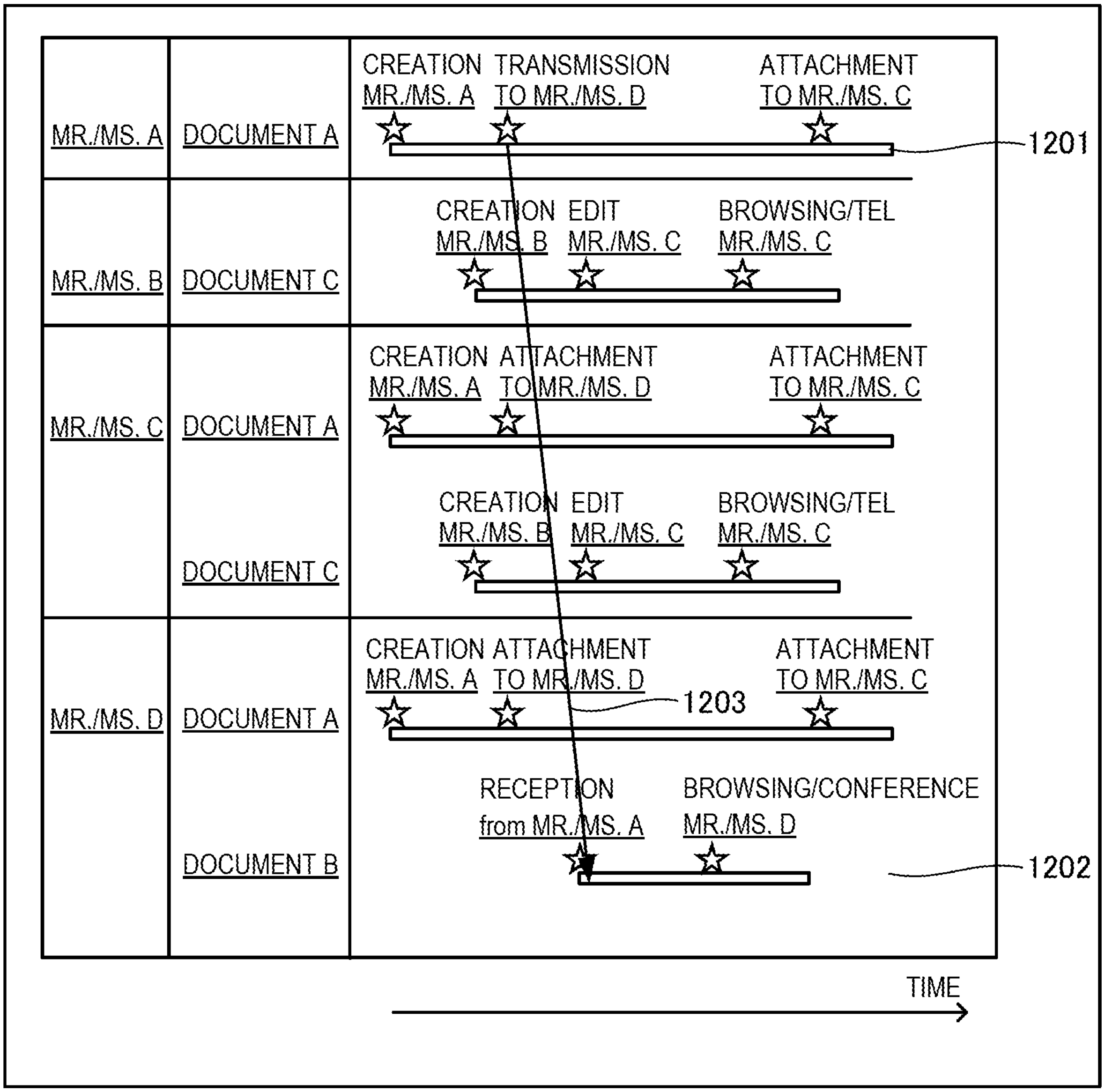
FIG. 12 is a view showing an example of a display image in the information processing system according to the second example embodiment of the present invention.

The browsing screen generator 213 may display, from a user perspective, a modification of the timelines in FIG. 10, as in FIG. 12. In this case as well, the browsing screen generator 213 displays a timeline 1201 indicating the use history of document A serving as the first content data and a timeline 1202 indicating the use history of document B serving as the second content data. The browsing screen generator 213 further displays, between the timelines 1201 and 1202, a link 1203 corresponding to the timing and type of communication.

Figure 13:
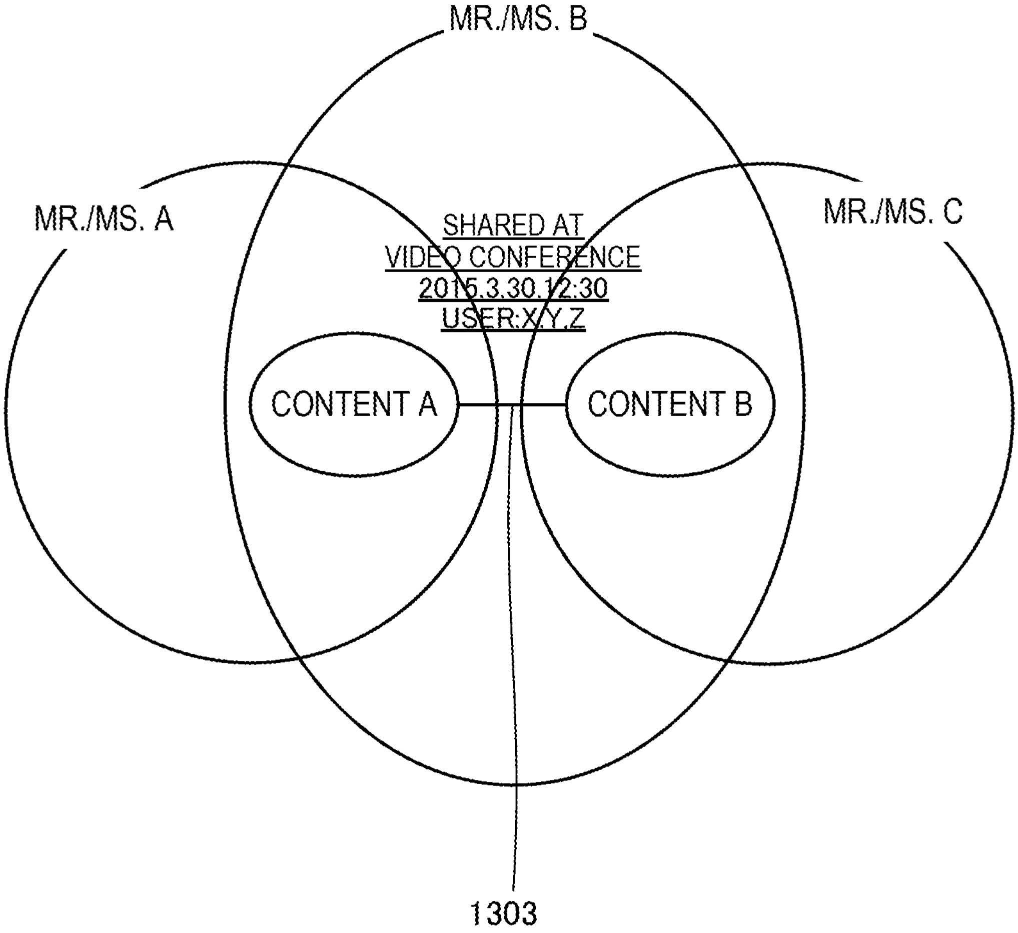
FIG. 13 is a view showing an example of a display image in the information processing system according to the second example embodiment of the present invention.

The browsing screen generator 213 may also display, as shown in FIG. 13, the relationship between users and content data owned by the users in a Venn diagram, and display a link 1303 corresponding to the timing and type of communication that connects the contents.

Figure 14:
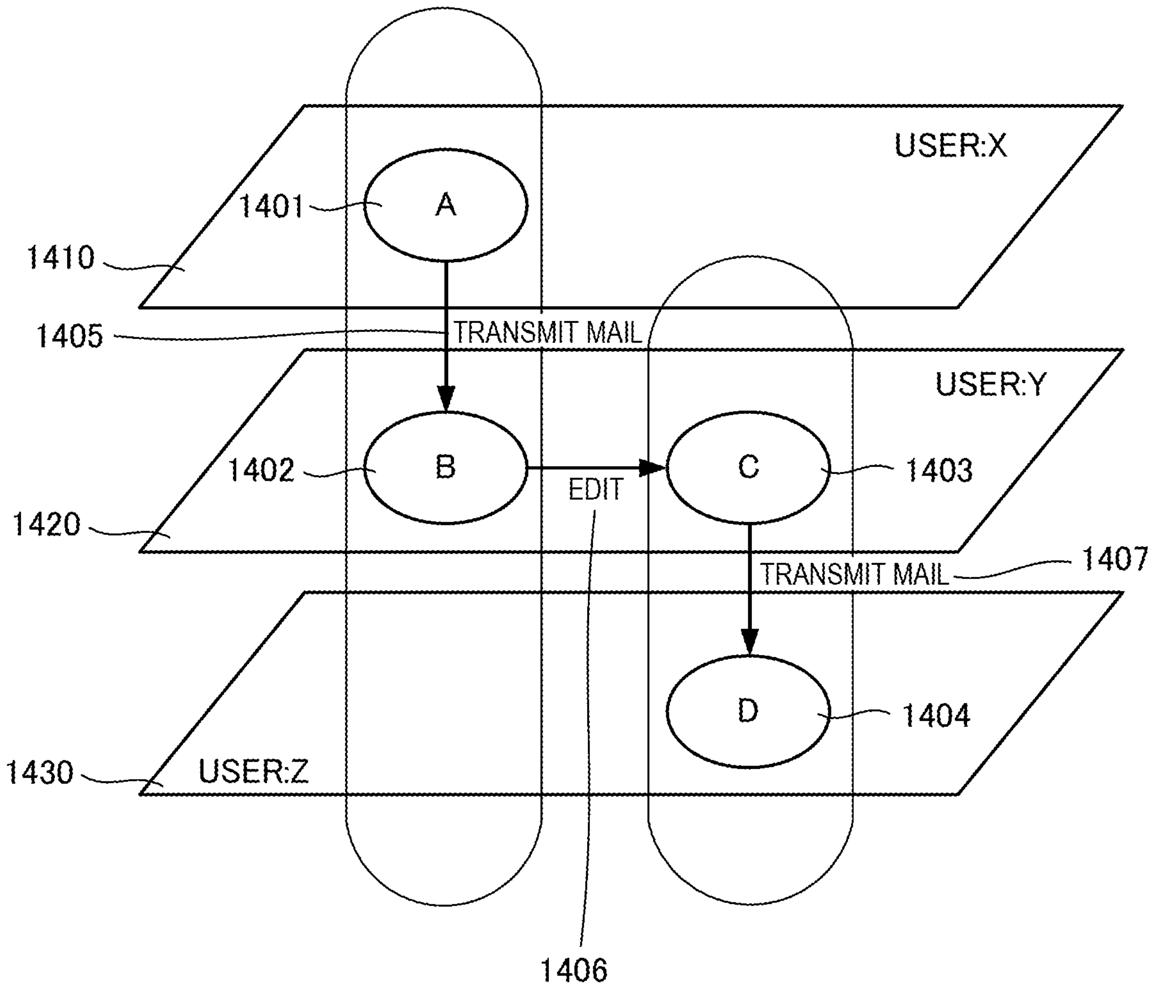
FIG. 14 is a view showing an example of a display image in the information processing system according to the second example embodiment of the present invention.

The browsing screen generator 213 may also show users on hierarchical planes 1410, 1420, and 1430, as shown in FIG. 14. Then, the browsing screen generator 213 may display contents as icons 1401 to 1404 on those planes, and display communication and operations indicating the relations among the contents as links 1405 to 1407 among the icons.

Figure 15:
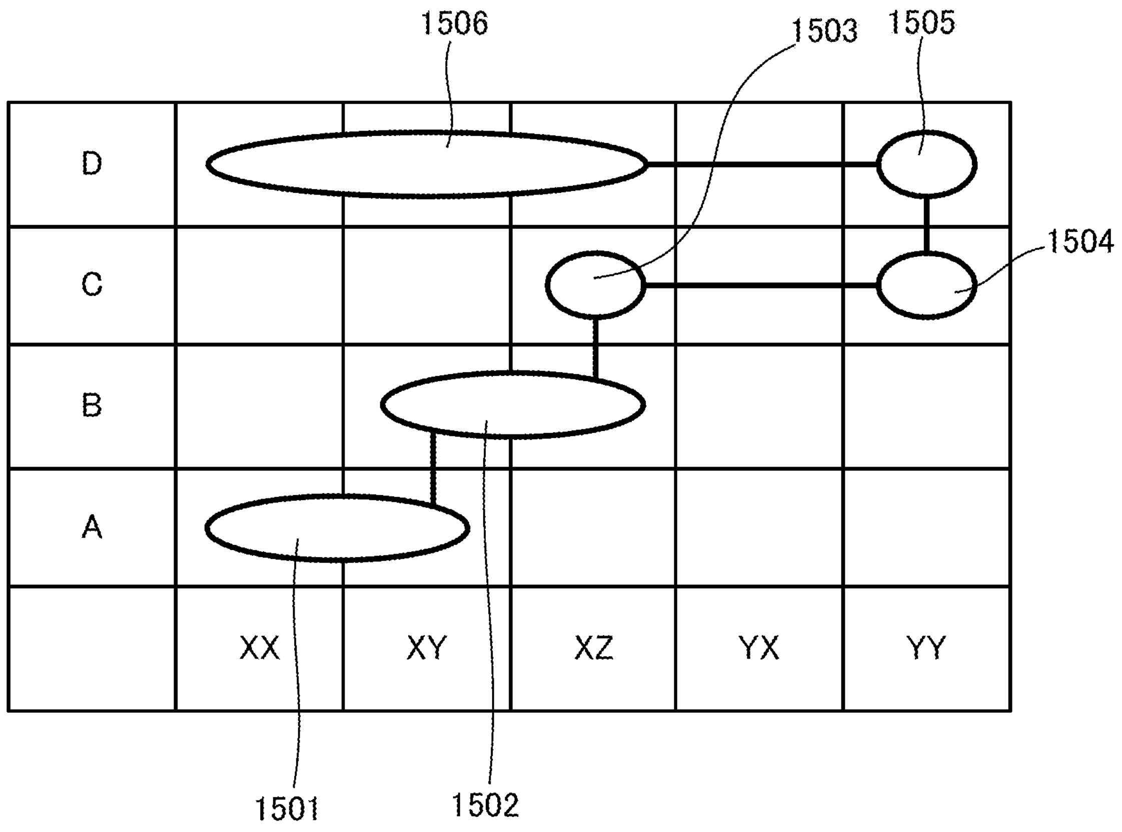
FIG. 15 is a view showing an example of a display image in the information processing system according to the second example embodiment of the present invention.

The browsing screen generator 213 may further display, in a table, the relationship between respective content data A, B, C, and D and holder users XX, XY, XZ, YX, and YY, and indicate the relations among them with icons 1501 to 1506, as shown in FIG. 15.

As described above, the relations among the plurality of content data are visualized very clearly, making it clear the circumstances under which the content data is made and also obtaining an effect capable of easily detecting illegal use, unlawfulness, or the like of a research paper.

[Third Example Embodiment]

Figure 16:
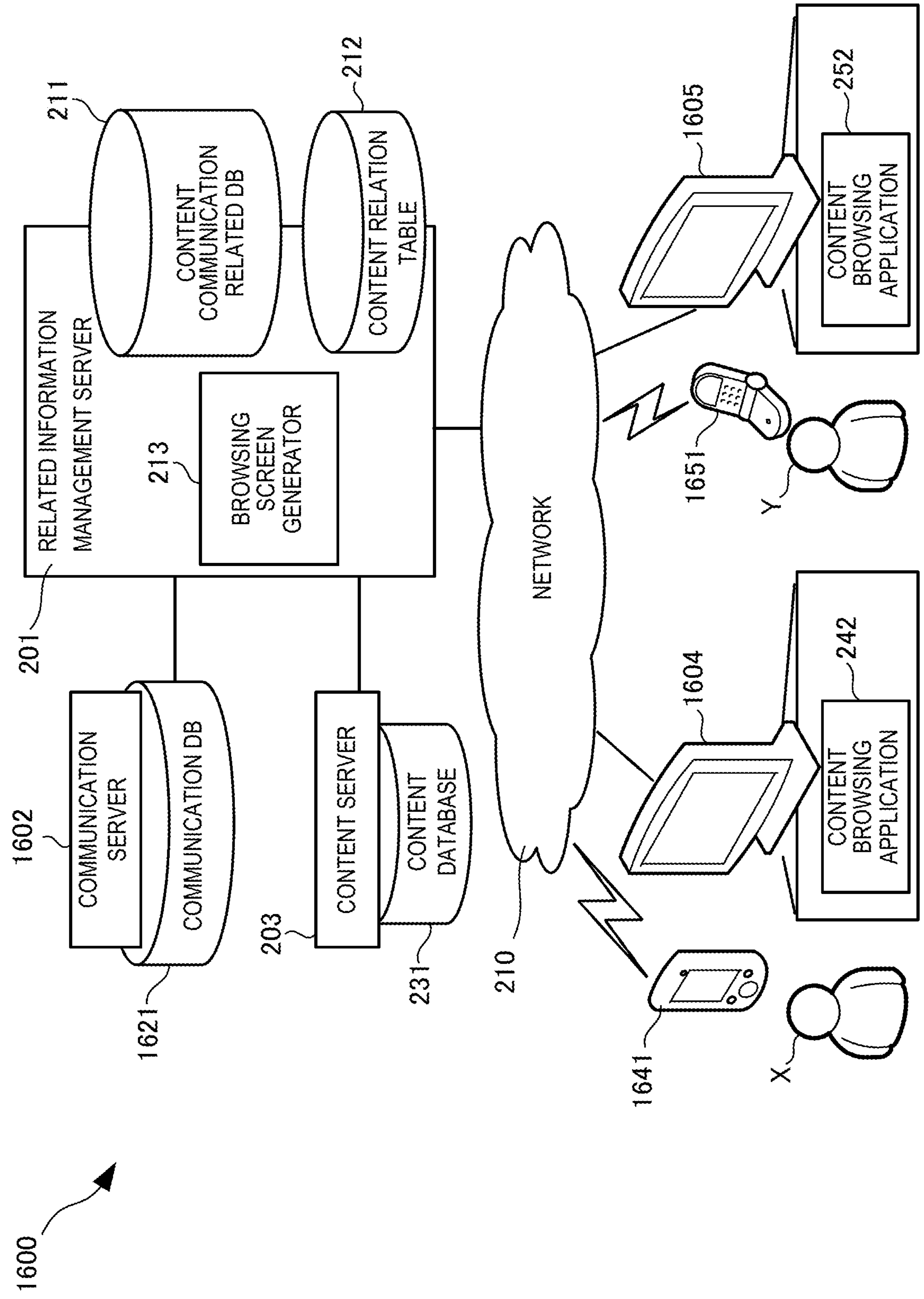
FIG. 16 is a block diagram showing the arrangement of an information processing system according to the third example embodiment of the present invention.

An information processing system according to the third example embodiment of the present invention will now be described with reference to FIG. 16. FIG. 16 is a view for explaining the functional arrangement of an information processing system 1600 according to this example embodiment. The information processing system 1600 according to this example embodiment differs from that of the second example embodiment described above in that a communication server 1602 and a communication database 1621 are included instead of the mail server and the mail database. They are also different in that user X and user Y perform communication by using communication terminals 1604 and 1605, and speech communication terminals 1641 and 1651. Another arrangement and operation are the same as in the second example embodiment. Thus, the same reference numerals denote the same arrangement and operation, and a detailed description thereof will be omitted.

The information processing system 1600 is connected to, via a network 210, at least two communication terminals 1604 and 1605 (such as PCs (Personal Computers) or tablets), and at least two speech communication terminals 1641 and 1651 (such as a cellular phone and a smartphone).

Then, the communication server 1602 functions as a speech control server that controls the speech communication between the speech communication terminals 1641 and 1651.

Figure 17:
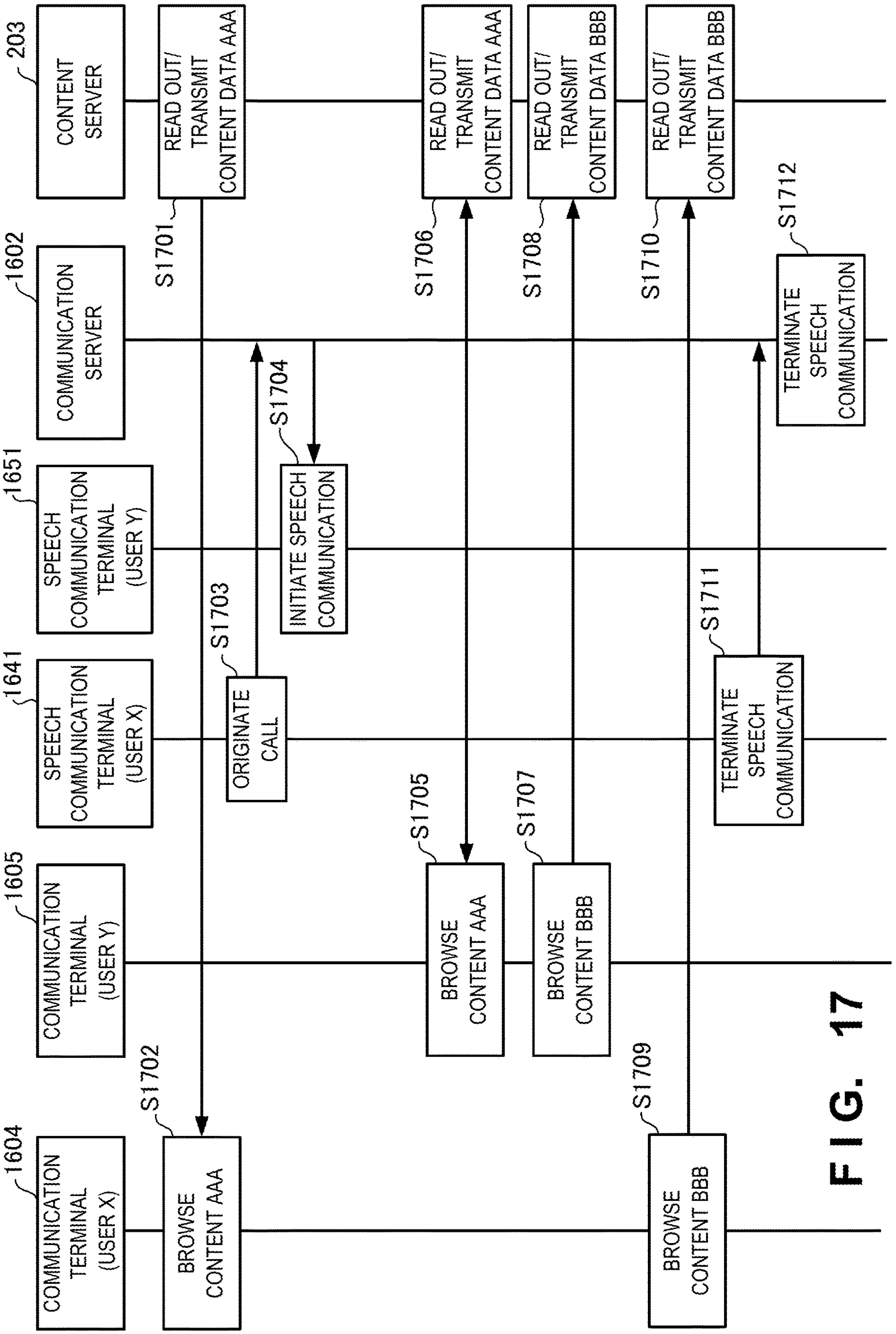
FIG. 17 is a sequence chart showing the operation of the information processing system according to the third example embodiment of the present invention.
Figure 18:
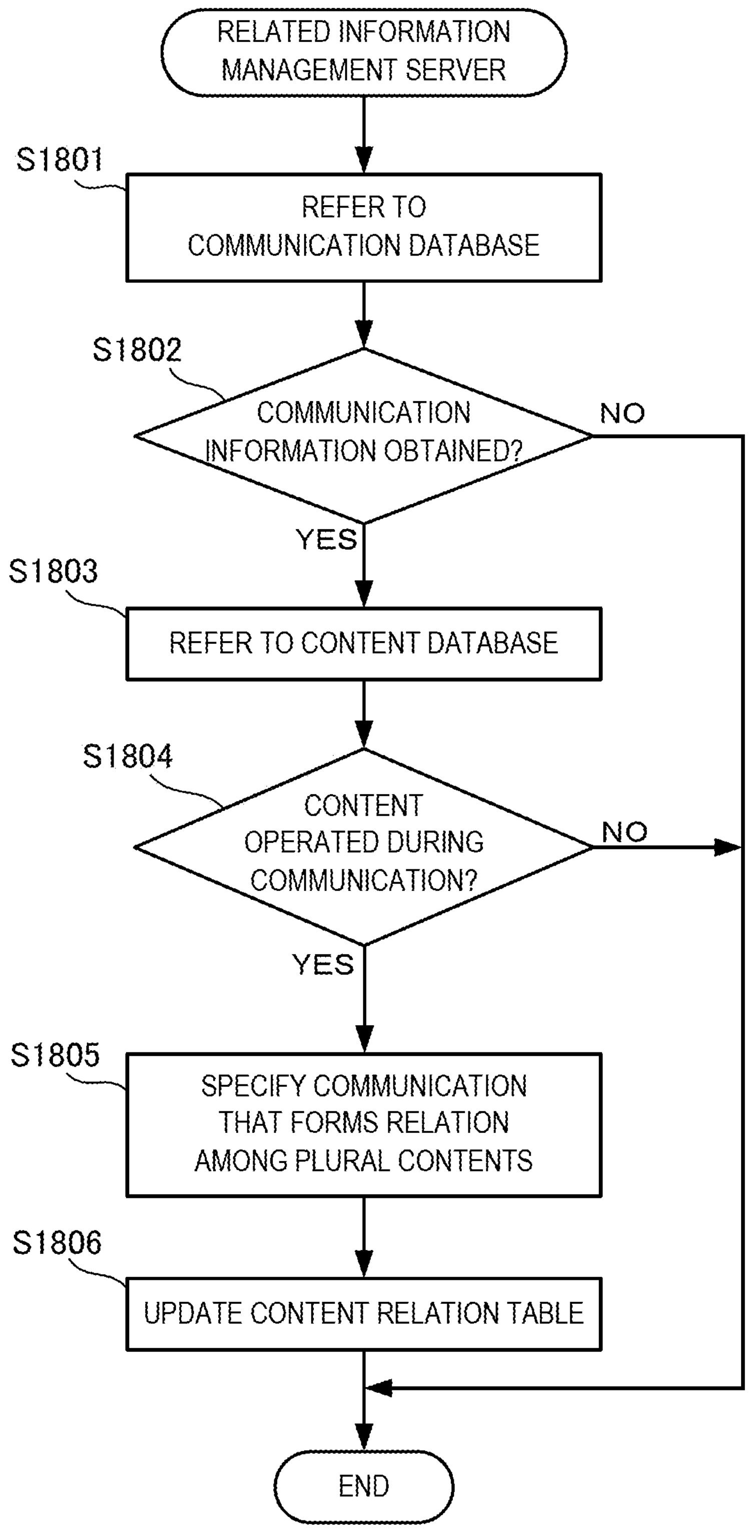
FIG. 18 is a flowchart showing the sequence of processing by a related information management server in the information processing system according to the third example embodiment of the present invention.

FIGS. 17 and 18 are a sequence chart and a flowchart for explaining an association operation when user X and user Y share and transmit a content between the communication terminal 1604 and the communication terminal 1605 during speech communication. As an example, a case will be described here in which user X uses a communication terminal 204 to transmit, to user Y, content AAA saved in a content server 203.

First, in step S1701, in accordance with an instruction from the communication terminal 1604, the content server 203 reads out content data AAA and transmits it to the communication terminal 204. Then, in step S1702, the communication terminal 1604 browses content data AAA. Further, user X of the communication terminal 204 originates a call to the speech communication terminal 1651 by using the speech communication terminal 1641 in step S1703, and receives the incoming call with the speech communication terminal 1651 in step S1704, initiating speech communication between the speech communication terminals 1641 and 1651.

During the speech communication, when the communication terminal 1605 sends a request to browse content AAA to the content server 203 in step S 1705, the content server 203 reads out content data AAA and transmits it to the communication terminal 1605 in step S1706.

Similarly, during the speech communication, when the communication terminal 1605 sends a request to browse content BBB to the content server 203 in step S1707, the content server 203 reads out content data BBB and transmits it to the communication terminal 1605 in step S1708.

Similarly, during the speech communication, when the communication terminal 1604 sends a request to browse content BBB to the content server 203 in step S1709, the content server 203 reads out content data BBB and transmits it to the communication terminal 1604 in step S1710.

Finally, user X performs an operation of terminating the speech communication in step S1711, terminating the speech communication between the speech communication terminals 1641 and 1651 (step S1712).

Unlike the second example embodiment, a related information management server 201 cannot obtain communication information from the communication terminals 1604 and 1605 in the sequence as described above. To cope with this, a content relation table 212 is updated by processing shown in FIG. 18.

First in step S1801, the related information management server 201 periodically refers to a communication database. Then, in step S1802, the related information management server 201 obtains communication information between the users newly generated from the time of the previous reference. If there is no newly generated communication information, the related information management server 201 ceases the processing. If there is the newly generated communication information, the related information management server 201 uses generation time of that communication (speech communication, a conference, or the like) to refer to a content database 231 in step S1803. Then, in step S 1804, the related information management server 201 determines whether there is a content operated (browsed, transmitted, edited, or the like) during the communication. If a plurality of contents are shared during the communication, assuming that the communication forms the relation among those contents in step S1805, the process advances to step S1806 in which the related information management server 201 updates the content relation table 212. More specifically, the related information management server 201 registers speech communication information (such as a speech communication date and time) as a link that links content AAA and content BBB with each other.

It becomes possible, with the above-described arrangement, to clearly display the relation among the plurality of contents, as in the second example embodiment.

[Other Example Embodiments]

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

The present invention is applicable to a system including a plurality of devices or a single apparatus. The present invention is also applicable even when an information processing program for implementing the functions of example embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described example embodiments.

The invention claimed is:

1. An information processing system comprising:

a database that saves, in association with each other, a content identifier that identifies content data and a communication identifier that identifies communication performed in relation to the content data; and a processor including an associator that associates a first content identifier that identifies first content data and a second content identifier that identifies second content data by using a communication identifier that identifies communication performed between a first user and a second user when the first content data and the second content data are shared in relation to the communication, wherein said database saves, in association with each other, the content identifier and a communication identifier that identifies an email attached with content data corresponding to the content identifier, wherein said associator associates the first content data held by the first user and the second content data with each other by a communication identifier that identifies an email if the first content data is transmitted to the second user by the email to cause the second user to hold the transmitted data as the second content data, wherein said database saves, in association with each other, the content identifier and a communication identifier that identifies speech communication performed while sharing and browsing content data corresponding to the content identifier, wherein said associator associates the first content data and the second content data with each other by a communication identifier that identifies speech communication between the first user and the second user if both a terminal of the first user and a terminal of the second user browse the first content data and the second content data while the speech communication is performed, wherein said database saves, in association with each other, the content identifier and a communication identifier that identifies a Web conference taken place while sharing and browsing content data corresponding to the content identifier, and wherein said associator associates the first content data and the second content data with each other by a communication identifier that identifies a Web conference in which the first user the second user participate if the first content data and the second content data are browsed at the Web conference.

2. The information processing system according to claim 1, further comprising a display that displays an icon representing the first content data and an icon representing the second content data, and further displays, between icons, a link corresponding to a type of the communication.

3. The information processing system according to claim 1, wherein said display displays a first timeline indicating a use history of the first content data and a second timeline indicating a use history of the second content data, and further displays, between the first timeline and the second timeline, a link corresponding to a timing and a type of the communication.

4. The information processing system according to claim 1, wherein said display displays a relationship between a user and content data owned by the user in a Venn diagram.

5. The information processing system according to claim 1, wherein said display hierarchically displays a relationship between respective content data.

6. The information processing system according to claim 1, wherein said display displays editorial transition of each content data in a tree diagram.

7. The information processing system according to claim 1, wherein said display displays a relationship between each content data and a holder user in a table.

8. An information processing method comprising:

saving, in association with each other, a content identifier that identifies content data and a communication identifier that identifies communication performed in relation to the content data; and associating a first content identifier that identifies first content data and a second content identifier that identifies second content data by using a communication identifier that identifies communication performed between a first user and a second user when the first content data and the second content data are shared in relation to the communication, wherein said saving saves, in association with each other, the content identifier and a communication identifier that identifies an email attached with content data corresponding to the content identifier, wherein said associating associates the first content data held by the first user and the second content data with each other by a communication identifier that identifies an email if the first content data is transmitted to the second user by the email to cause the second user to hold the transmitted data as the second content data, wherein said saving saves, in association with each other, the content identifier and a communication identifier that identifies speech communication performed while sharing and browsing content data corresponding to the content identifier, wherein said associating associates the first content data and the second content data with each other by a communication identifier that identifies speech communication between the first user and the second user if both a terminal of the first user and a terminal of the second user browse the first content data and the second content data while the speech communication is performed, wherein said saving saves, in association with each other, the content identifier and a communication identifier that identifies a Web conference taken place while sharing and browsing content data corresponding to the content identifier, and wherein said associating associates the first content data and the second content data with each other by a communication identifier that identifies a Web conference in which the first user and the second user participate if the first content data and the second content data are browsed at the Web conference.

9. An information processing program for storing on a non-transitory computer-readable medium and for causing a computer to execute a method, the method comprising:

saving, in association with each other, a content identifier that identifies content data and a communication identifier that identifies communication performed in relation to the content data; and associating a first content identifier that identifies first content data and a second content identifier that identifies second content data by using a communication identifier that identifies communication performed between a first user and a second user when the first content data and the second content data are shared in relation to the communication, wherein said saving saves, in association with each other, the content identifier and a communication identifier that identifies an email attached with content data corresponding to the content identifier, wherein said associating associates the first content data held by the first user and the second content data with each other by a communication identifier that identifies an email if the first content data is transmitted to the second user by the email to cause the second user to hold the transmitted data as the second content data, wherein said saving saves, in association with each other, the content identifier and a communication identifier that identifies speech communication performed while sharing and browsing content data corresponding to the content identifier, wherein said associating associates the first content data and the second content data with each other by a communication identifier that identifies speech communication between the first user and the second user if both a terminal of the first user and a terminal of the second user browse the first content data and the second content data while the speech communication is performed, wherein said saving saves, in association with each other, the content identifier and a communication identifier that identifies a Web conference taken place while sharing and browsing content data corresponding to the content identifier, and wherein said associating associates the first content data and the second content data with each other by a communication identifier that identifies a Web conference in which the first user and the second user participate if the first content data and the second content data are browsed at the Web conference.

* * * * *